(12) United States Patent
Huang et al.

(10) Patent No.: US 11,164,384 B2
(45) Date of Patent: Nov. 2, 2021

(54) MOBILE DEVICE IMAGE ITEM REPLACEMENTS

(71) Applicant: Houzz, Inc., Palo Alto, CA (US)

(72) Inventors: Xiaoyi Huang, Palo Alto, CA (US); Jingwen Wang, Palo Alto, CA (US); Yi Wu, Palo Alto, CA (US); Xin Ai, Palo Alto, CA (US)

(73) Assignee: Houzz, Inc., Palo Alto, CA (US)

( * ) Notice: Subject to any disclaimer, the term of this patent is extended or adjusted under 35 U.S.C. 154(b) by 0 days.

(21) Appl. No.: 16/521,359

(22) Filed: Jul. 24, 2019

(65) Prior Publication Data

US 2021/0027539 A1   Jan. 28, 2021

(51) Int. Cl.
| | | |
|---|---|---|
| G06T 19/00 | (2011.01) | |
| G06F 3/0488 | (2013.01) | |
| G06T 15/50 | (2011.01) | |
| G06F 3/0482 | (2013.01) | |

(52) U.S. Cl.
CPC .......... *G06T 19/006* (2013.01); *G06F 3/0482* (2013.01); *G06F 3/04883* (2013.01); *G06T 15/506* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,240,055 B1 * | 1/2016 | Liu | G06T 5/005 |
| 10,380,803 B1 * | 8/2019 | Jaafar | G06T 19/20 |
| 10,482,674 B1 * | 11/2019 | Wu | G06Q 30/0276 |
| 10,540,812 B1 * | 1/2020 | Yildiz | G06T 15/506 |
| 2016/0062615 A1 * | 3/2016 | Price | G06F 3/0488 |
| | | | 715/779 |
| 2017/0032551 A1 | 2/2017 | Fried et al. | |
| 2017/0148223 A1 * | 5/2017 | Holzer | G06F 16/532 |
| 2017/0186241 A1 | 6/2017 | Zavesky | |
| 2019/0089910 A1 * | 3/2019 | Banik | G06T 5/005 |
| 2020/0302634 A1 * | 9/2020 | Pollefeys | G06T 7/70 |

FOREIGN PATENT DOCUMENTS

WO   WO-2021016512 A1   1/2021

OTHER PUBLICATIONS

Guilin Liu et al. (Guilin Liu, et al., "Image Inpainting for Irregular Holes Using Partial Convolutions", Proceedings of the European Conference on Computer Vision (ECCV), 2018, pp. 85-100) (Year: 2018).*
"International Application Serial No. PCT/US2020/043385, International Search Report dated Oct. 23, 2020", 2 pgs.
"International Application Serial No. PCT/US2020/043385, Written Opinion dated Oct. 23, 2020", 6 pgs.

* cited by examiner

*Primary Examiner* — William A Beutel
(74) *Attorney, Agent, or Firm* — Schwegman Lundberg & Woessner, P.A.

(57) ABSTRACT

A system for replacing physical items in images is discussed. A depicted item can be selected and removed from an image via image mask data and pixel merging techniques. Virtual light source positions can be generated based on real-world light source data from the image. A rendered simulation of a virtual item can then be integrated into the image to create a modified image for display.

20 Claims, 19 Drawing Sheets

MOBILE DEVICE IMAGE ITEM REPLACEMENTS

TECHNICAL FIELD

Embodiments of the present disclosure relate generally to image manipulation and, more particularly, but not by way of limitation, to image processing.

BACKGROUND

Increasingly, users would like to simulate an object (e.g., chair, table, lamp) in a physical room without having access to the object. For example, a user may be browsing a network site (e.g., website) and see a floor lamp that may or may not match the style of the user's living room. The user may take a picture of his living room and overlay an image of the floor lamp in the picture to simulate what the floor lamp would look like in the living room. However, it can be difficult to adjust the floor lamp within the modeling environment using a mobile client device, which has limited resources (e.g., a small screen, limited processing power). Additionally, if the user living room already has a floor lamp, it is difficult to replace the physical floor lamp in the image with a simulated floor lamp through the mobile client device (e.g., in images or video generated by the mobile client device).

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
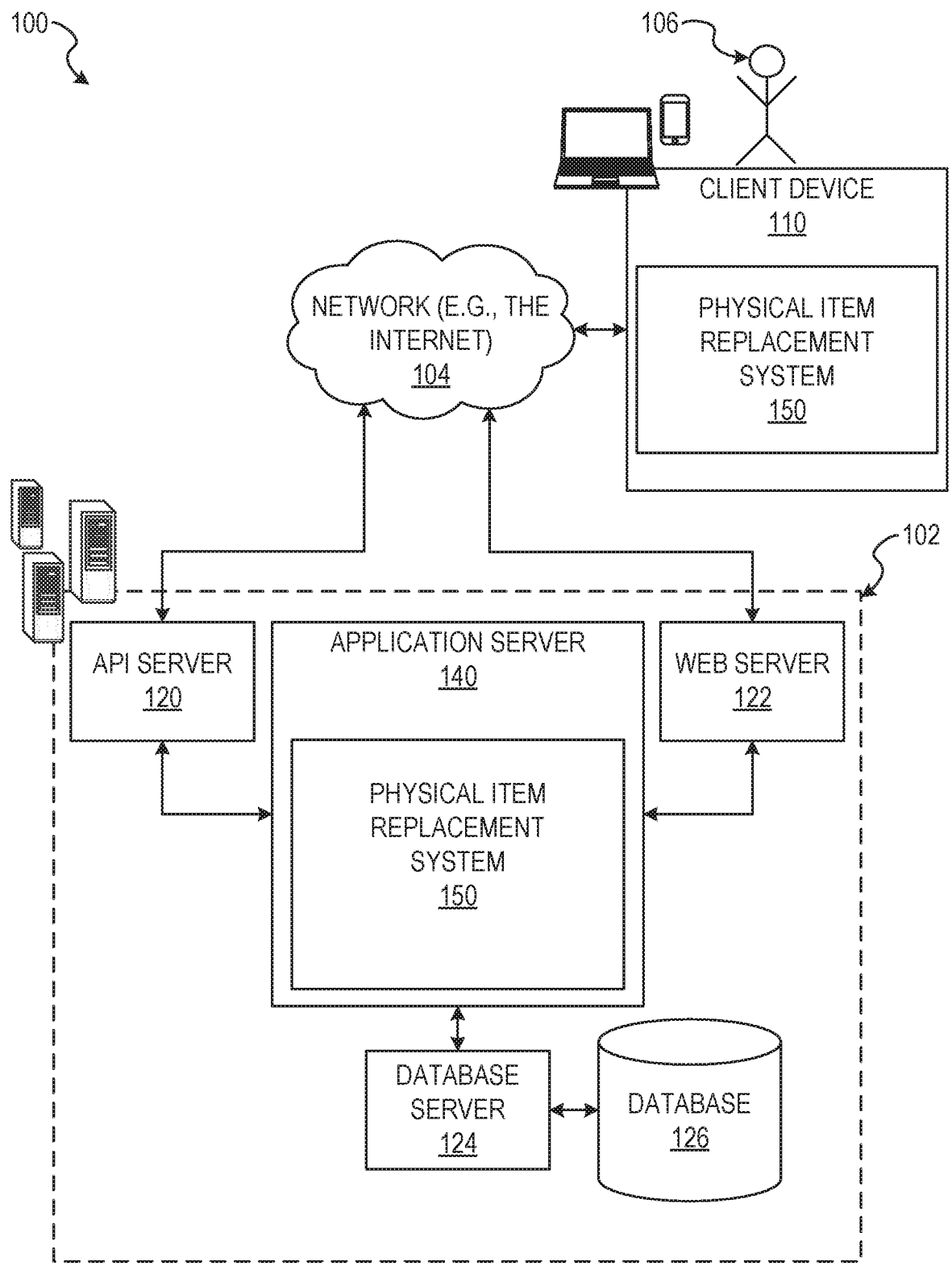
FIG. 1 is a block diagram showing an example network architecture for physical item replacement and simulations, according to some example embodiments.

With reference to FIG. 1, an example embodiment of a high-level client-server-based network architecture 100 is shown. A networked system 102, in the example form of a network-based rendering platform, can provide server-side rendering via a network 104 (e.g., the Internet or a wide area network (WAN)) to one or more client devices 110. In some implementations, a user 106 interacts with the networked system 102 using the client device 110. The client device 110 may execute a physical item replacement system 150 as a local application or a cloud-based application (e.g., through an Internet browser).

In various implementations, the client device 110 comprises a computing device that includes at least a display and communication capabilities that provide access to the networked system 102 via the network 104. The client device 110 comprises, but is not limited to, a remote device, work station, computer, general-purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic system, game console, set-top box, network personal computer (PC), mini-computer, and so forth. In an example embodiment, the client device 110 comprises one or more of a touch screen, accelerometer, gyroscope, biometric sensor, camera (e.g., an RGB based camera, a depth sensing camera), microphone, Global Positioning System (GPS) device, and the like.

The client device 110 communicates with the network 104 via a wired or wireless connection. For example, one or more portions of the network 104 comprise an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI® network, a Worldwide Interoperability for Microwave Access (WiMax) network, another type of network, or any suitable combination thereof.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch-screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An API server 120 and a web server 122 are coupled to, and provide programmatic and web interfaces respectively to, one or more application servers 140. The application server 140 can host a physical item replacement system 150, which can comprise one or more modules or applications, and which can be embodied as hardware, software, firmware, or any combination thereof. The application server 140 is, in turn, shown to be coupled to a database server 124 that facilitates access to one or more information storage repositories, such as a database 126. In an example embodiment, the database 126 comprises one or more storage devices that store information to be accessed by the physical item replacement system 150. Additionally, in some embodiments, the information may be cached locally on the client device 110. Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example.

Figure 2:
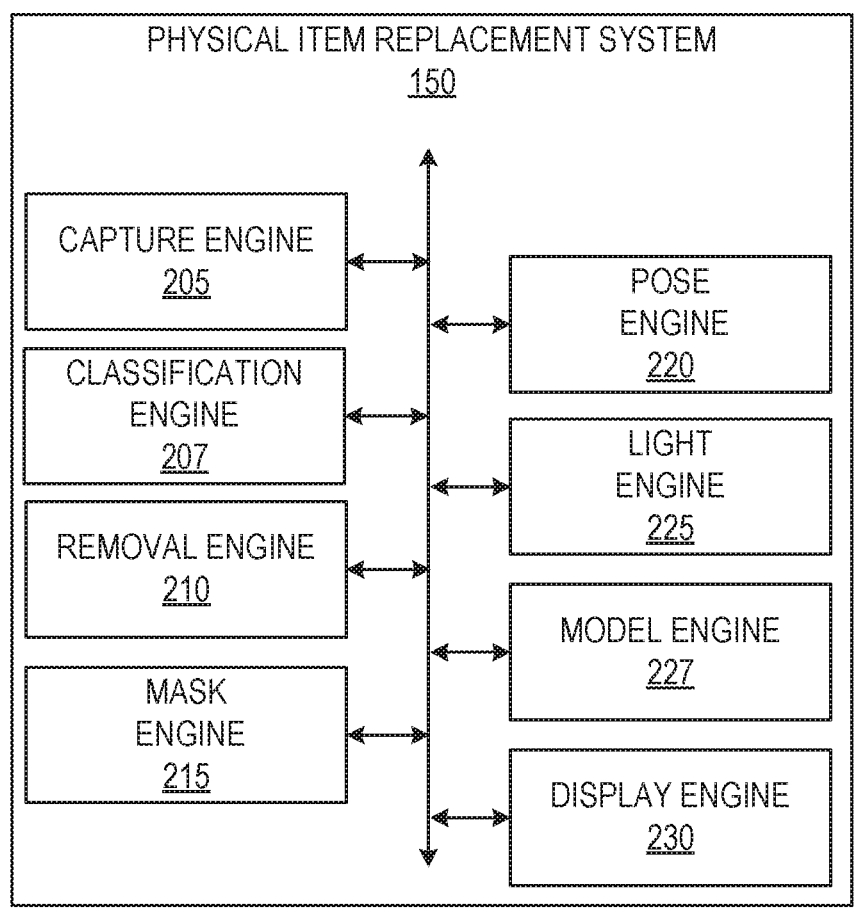
FIG. 2 shows example internal functional engines of a physical item replacement system, according to some example embodiments.

FIG. 2 shows example internal functional engines of a physical item replacement system 150, according to some example embodiments. As illustrated, the physical item replacement system 150 comprises a capture engine 205, a classification engine 207, a removal engine 210, a mask engine 215, a pose engine 220, a light engine 225, a model engine 227, and a display engine 230. The capture engine 205 is configured to generate images (e.g., an image, an image sequence, live video) using an image sensor of a user device (e.g., a client device). The classification engine 207 manages classifying an object to be removed in an image. The generated classification (e.g., object category) can be used to recommend objects to replace the object (e.g., if the user selects a chair, other chairs in a chair category can be displayed for selection by the user). In some example embodiments, the generated classification is used by the pose engine 220 to select a machine learning scheme trained to detect poses for a certain class of objects (e.g., a convolutional neural network trained to detect poses of chairs, another convolutional scheme trained to detect the poses of an articulating-arm floor lamp, etc.).

The removal engine 210 is configured to receive a selection of a region in an image and remove an object depicted in the region using areas surrounding the selected region. For example, the removal engine 210 can generate an image mask for a given image that indicates which region includes the object to be replaced (e.g., the mask is used to denote or create an image hole in the original image to be filled in via inpainting or other interpolation approaches).

The mask engine 215 is configured to generate the mask data based on an input selection received from the user. For example, the user can perform a circle gesture on the item depicted on a touch screen to indicate that the encircled image is to be removed, or the user can tap on the item and a segmented portion of the image that contains the depicted item is then stored as the mask area. In some example embodiments, the mask engine 215 comprises an image segmentation neural network that segments an image into different areas. The segmented areas can then be selected via tapping, as described above.

The pose engine 220 is configured to determine the pose of a selected item to be removed. The determined pose is then used to arrange the virtual item that is to replace the removed item in the same pose. In some example embodiments, the pose engine 220 is trained on images of different classes of objects (e.g., images of chairs and lamps), and the pose engine 220 attempts to generate the pose data using the model for a given object type (e.g., if a chair object category is detected, the pose engine 220 applies a neural network model that has been trained on images of chair poses/orientations). As such, according to some example embodiments, the pose engine 220 comprises a plurality of pose detection neural networks, where each neural network is trained for a different type of object.

The light engine 225 manages detecting light sources in an image, which can be used by the model engine 227 to position virtual light sources for virtual object rendering. The model engine 227 is configured to manage a virtual 3D modeling environment for rendering of a virtual item for overlay over the image captured by the capture engine 205. The display engine 230 is configured to generate user interfaces for interaction with a user of a client device, and receive interactions (e.g., selection of a region in an image) from the user through said user interfaces.

Figure 3:
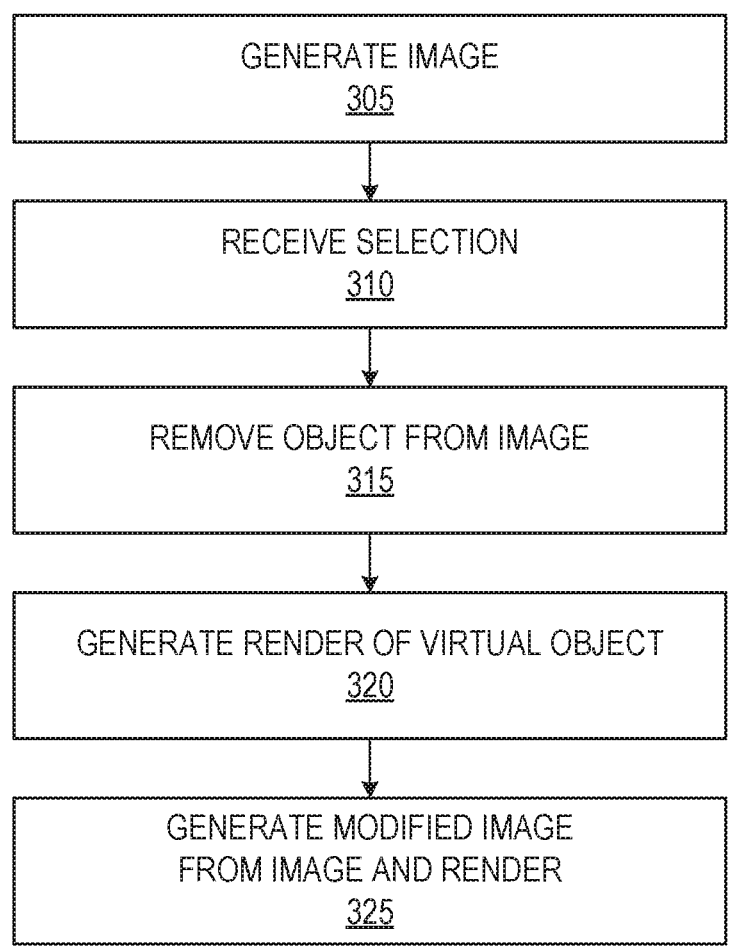
FIG. 3 shows a flow diagram of an example method for physical item replacement, according to some example embodiments.

FIG. 3 shows a flow diagram of an example method 300 for physical item replacement, according to some example embodiments. It is to be appreciated that, although in the example here only a single image is discussed, in some example embodiments, the image is one frame of an image sequence or live video. In those example embodiments, the method 300 is applied to each frame of the sequence, and such frames are displayed on the user device's screen in real time or near-real time. At operation 305, the capture engine 205 generates an image. For example, the image can be of a chair in a room. At operation 310, the removal engine 210 receives a selection of a region in the image depicting an object to be removed. For example, the user may tap on the chair in the image, or may scribble on the chair in the image, as discussed in further detail below. The received input can then be used to generate an image mask that indicates a hole region to be filled in by surrounding areas.

At operation 315, the removal engine 210 removes the object from the image. In some example embodiments, at operation 315 the removal engine 210 removes the object by merging areas surrounding the image into the image area (e.g., inpainting, interpolation). At operation 320, the model engine 227 generates a render of a virtual object to replace the removed object in the image. For example, after the object in the image has been removed via inpainting, the model engine 227 generates a render of a 3D chair model for integration into the image. At operation 325, the model engine 227 generates a modified image by overlaying and integrating (e.g., blending) the render into the image.

Figure 4:
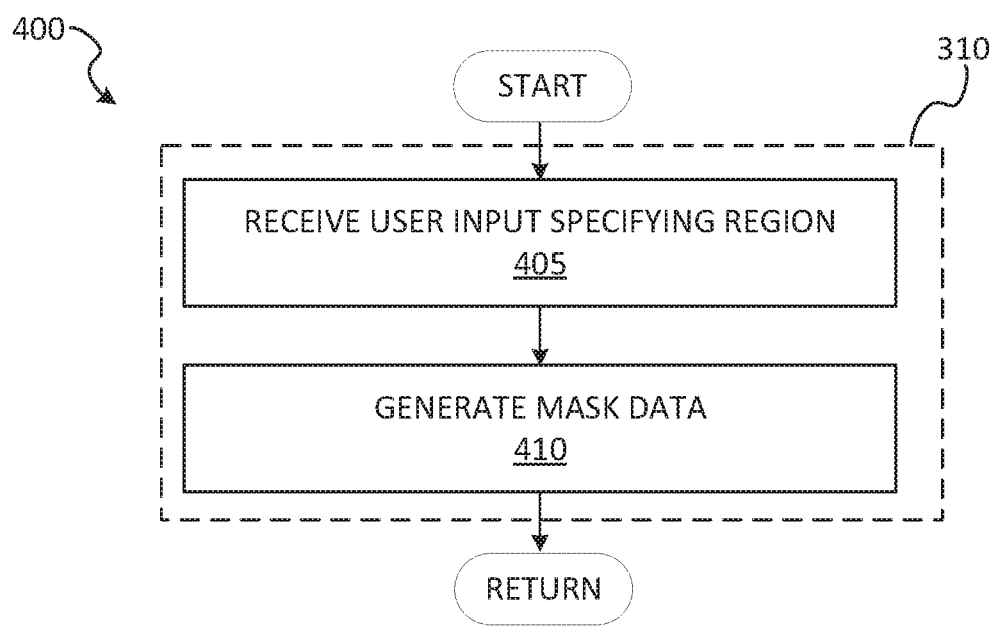
FIG. 4 shows a flow diagram of an example method for receiving a selection of a physical object to be removed in an image, according to some example embodiments.

FIG. 4 shows a flow diagram of an example method 400 for receiving a selection of a physical object to be removed in an image, according to some example embodiments. As illustrated, the operations of the method 400 may be implemented as a subroutine of operation 310 of the method 300 of FIG. 3, in which a selection of an image is received. At operation 405, the removal engine 210 receives user input on the image specifying a region of the image depicting the object to be removed. For example, while the image is displayed on the display device, the user can tap on a depicted chair to be removed, drag a shape (e.g., a rectangle) around the depicted chair, perform a circular gesture around the depicted chair to roughly outline it, or scribble over the chair, according to some example embodiments.

At operation 410, the mask engine 215 generates an image mask from the specified region. For example, if the user drags a rectangular UI shape element over the depicted chair, then at operation 410 the mask engine 215 generates an image mask where the pixels of the rectangular region are masked (e.g., set to "0") while the surrounding areas are unaltered or set to another value (e.g., set to "1"). After the user input is received and region data stored (e.g., stored as an image mask), the stored region data can be input into a machine learning scheme to remove the depicted physical object from the image. In some example embodiments, at operation 410 the mask data is applied to the image to create a "hole" in the image corresponding to the masked areas. For example, all pixels in the original image of the chair denoted by the rectangular region can be deleted or otherwise removed to create a hole in the original image where the chair was originally depicted. According to some example embodiments, the original image with the hole created by the image mask is the data used for inpainting and interpolation.

Figure 5:
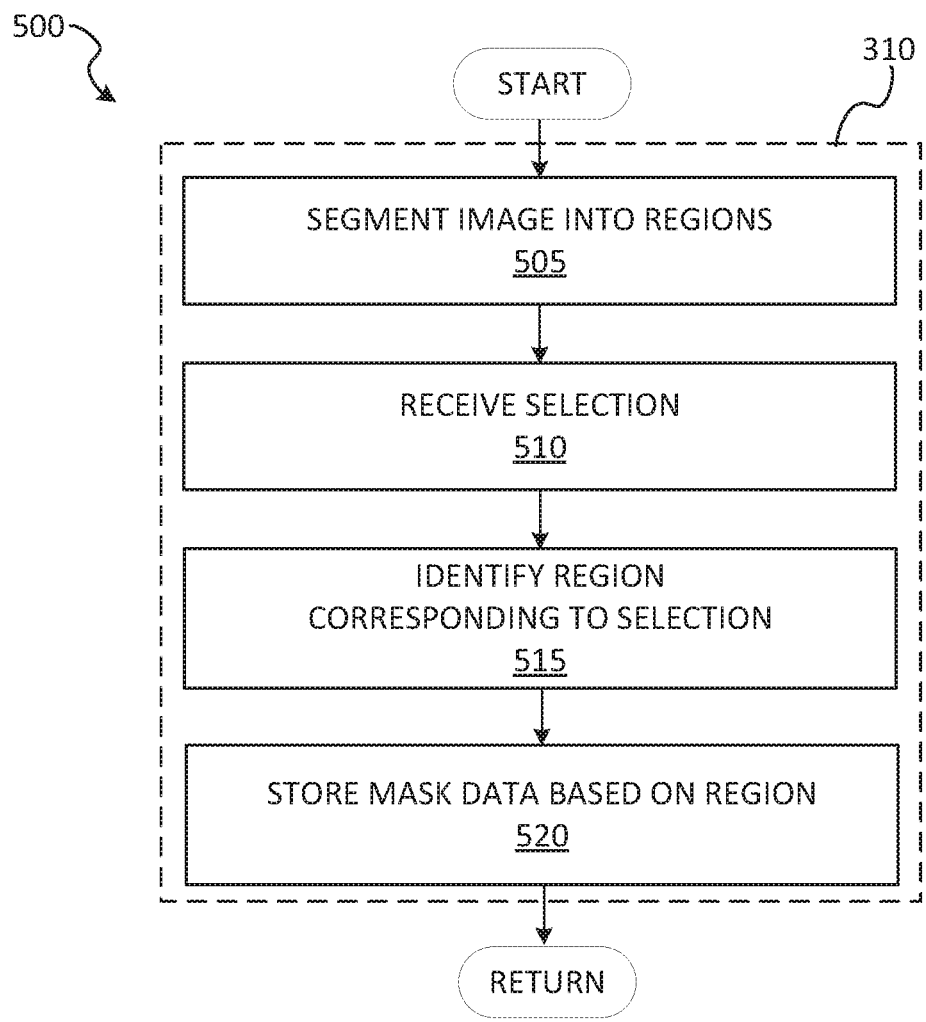
FIG. 5 shows a flow diagram of an example method for receiving a selection of a physical object to be removed in an image using segmentation, according to some example embodiments.

FIG. 5 shows a flow diagram of an example method 500 for receiving a selection of a physical object to be removed in an image using segmentation, according to some example embodiments. Image segmentation is a computational task in which an image segmentation neural network identifies different regions of an image (e.g., a face region, an eye region, a background region, a foreground region, etc.) and labels the pixels of each region (e.g., generates a mask for each region) for later processing (e.g., image manipulation of a given region). The operations of the method 500 may be implemented as a subroutine of operation 310 of the method 300 in FIG. 3, in which a selection of the item is received.

At operation 505, the removal engine 210 segments an image into regions. For example, the removal engine 210 implements a convolutional neural network trained to perform image segmentation to label different areas of an image (e.g., a background area, a chair area, a human face area, etc.) and create masks to denote the different regions/ segments. At operation 510, the mask engine 215 receives a selection within the image. For example, the user may tap or mouse click on a chair to be removed in the image. At operation 515, the removal engine 210 identifies the region corresponding to the selection. For example, if, at operation 510, the user selects any pixel depicting a chair region, then at operation 515 the removal engine 210 identifies all pixels labeled as being a chair region at operation 505, or selects an image mask for the chair region. At operation 520, the mask engine 215 stores the pixel data of the region for input into the neural network for object removal. For example, at operation 520, the mask engine 215 stores an image mask for the region selected via a tap gesture.

Figure 6:
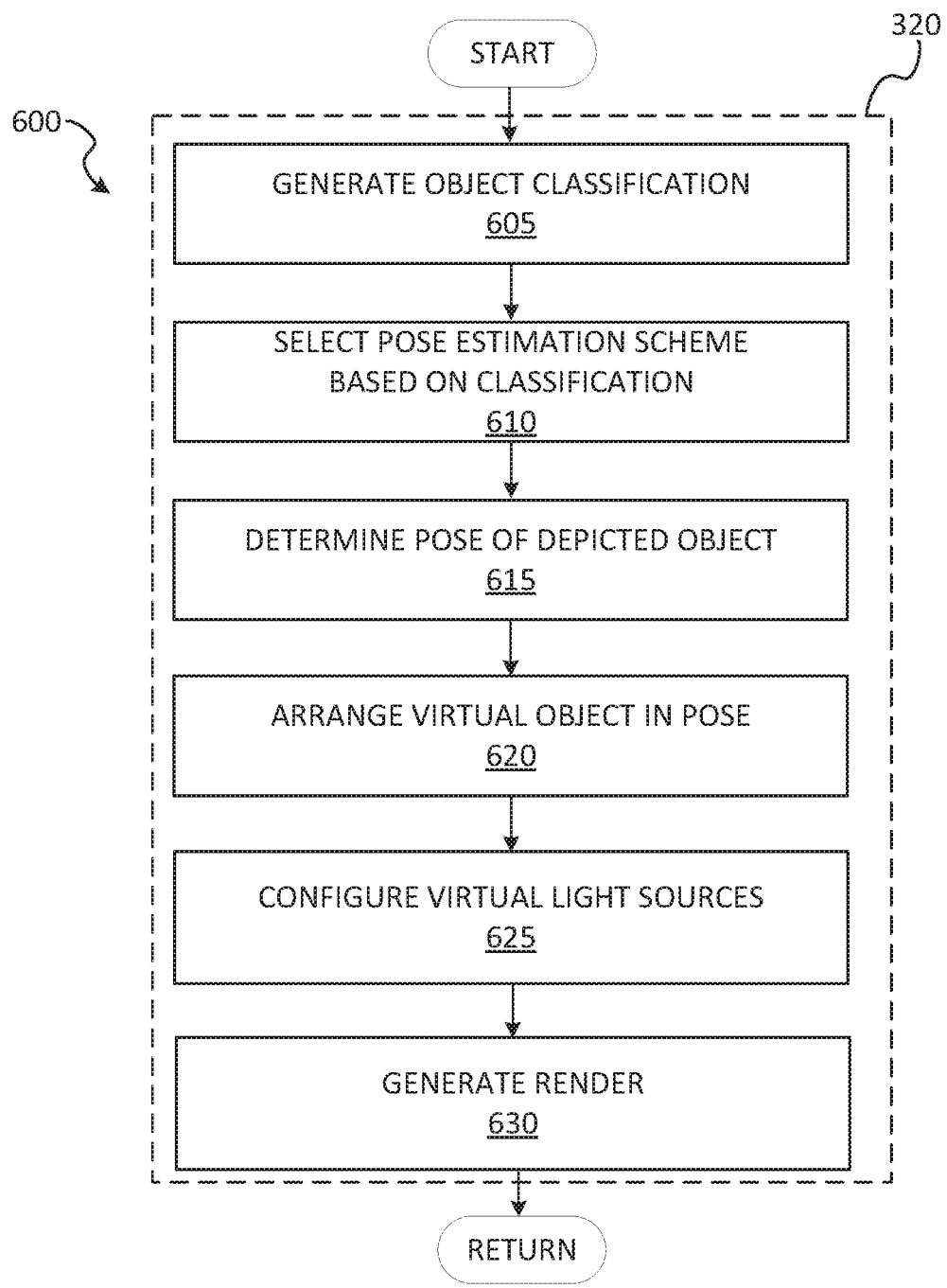
FIG. 6 shows an example flow diagram of a method for generating a render of a virtual item in an arranged pose, according to some example embodiments.

FIG. 6 shows an example flow diagram of a method 600 for generating a render of a virtual item in an arranged pose, according to some example embodiments. The operations of the method 600 may be implemented as a subroutine of operation 320 of the method 300 in FIG. 3, in which a render of a virtual object is generated. At operation 605, the classification engine 207 classifies the depicted object to determine a classification or category for the depicted object. For example, at operation 605 the classification engine 207 determines that, the selected object is a type of chair and therefore generates and stores a chair category for the item. At operation 610, the pose engine 220 selects a pose estimation scheme based on the classification generated at operation 605. For example, at operation 610, the pose engine 220 selects a convolutional neural network trained to detect chair poses based on chair training images.

At operation 615, the pose engine 220 determines the pose of the depicted physical object. For example, at operation 615 the pose engine 220 applies the selected machine learning scheme for the given classification assigned to the depicted object to determine that the chair backside is facing the wall, away from the user at an angle.

At operation 620, the model engine 227 arranges the virtual object to match the pose of the depicted physical object. For example, the model engine 227 arranges a chair 3D virtual model so that the backside of the chair is not facing the virtual camera (where the virtual camera is set by the user's perspective, as discussed in further detail with reference to FIG. 12 below.)

At operation 625, the model engine 227 arranges virtual light sources in a modeling environment (e.g., a 3D model rendering environment executing on the user device) to cast virtual light rays on the virtual item to mimic the real-world environment depicted in the image (e.g., the room being imaged and displayed in real time on the display device). At operation 630, the model engine 227 generates a render of the arranged and virtually illuminated virtual item, which can then be blended into the image and displayed on the mobile device screen.

Figure 7:
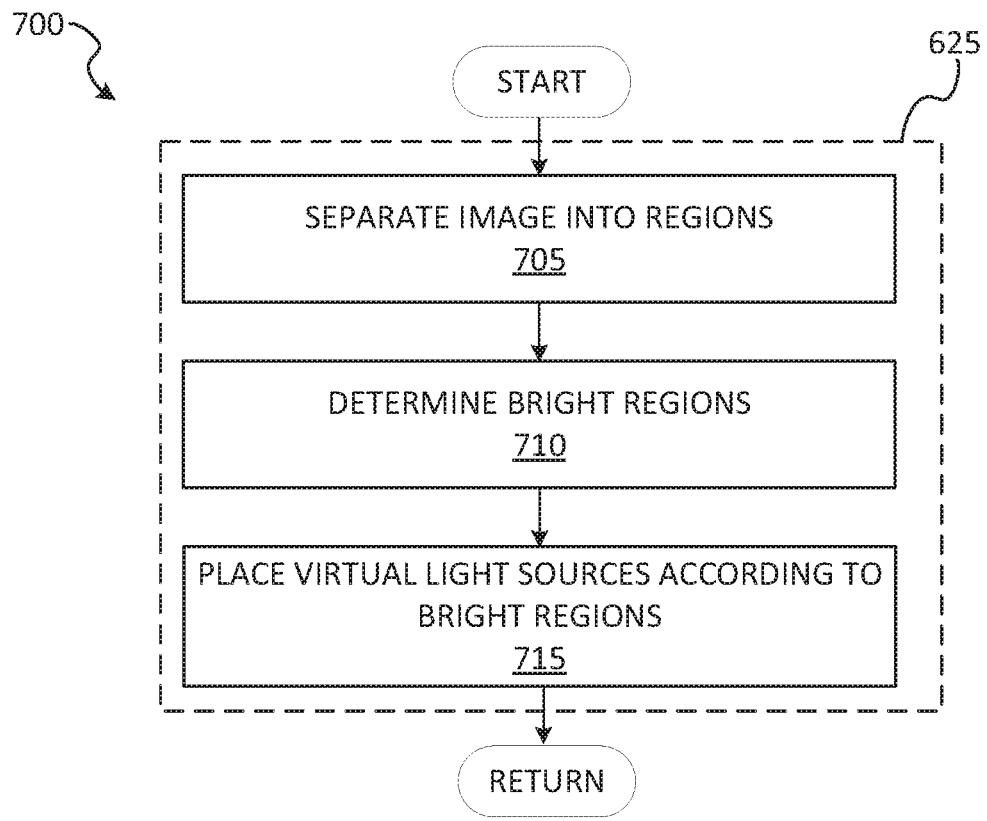
FIG. 7 shows a flow diagram of a method for orchestration of virtual light sources based on a user's real-world environment, according to some example embodiments.

FIG. 7 shows a flow diagram of a method 700 for orchestration of virtual light sources based on a user's real-world environment, according to some example embodiments. The operations of the method 700 may be implemented as a subroutine of operation 625 of the method 600 in FIG. 6, in which lighting is configured.

At operation 705, the light engine 225 separates the image into regions, such as a top left region, a top right region, a bottom left region, and a bottom right region. At operation 710, the light engine 225 determines the brightest regions based on luminance or pixel values in the regions. For example, the light engine 225 determines that the top right region is the brightest region. At operation 715, the light engine 225 stores virtual light position data (e.g., top right region as the brightest region), and the model engine 227 uses the position data to position a virtual light in the upper right portion of the virtual room (e.g., above and to the right of a virtual item in the modeling environment). For example, the light engine 225 can further store subarea position data indicating that, within the top right region, the top left portion is brightest, thereby indicating to the model engine 227 to position a virtual light source to correspond to the subarea position data.

Figure 8:
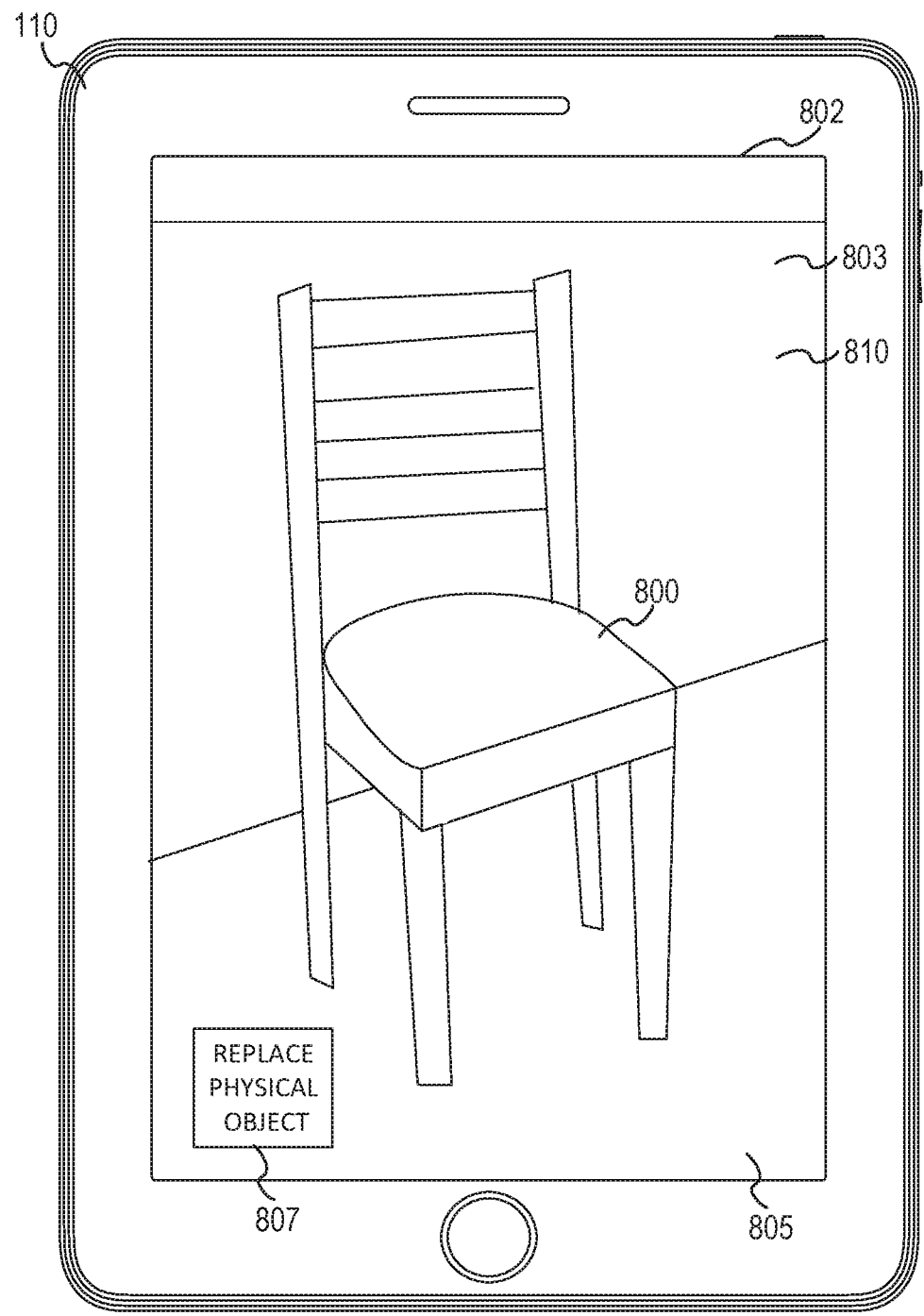
FIG. 8 shows an example user interface for removing a physical item, according to some example embodiments.

FIG. 8 shows an example user interface 802 of client device 110 for removing a physical item, according to some example embodiments. The user interface 802 includes an image 803 of a chair 800 sitting on the ground 805 in front of a wall 810. The chair 800 is an example of a depicted physical item that a user of the client device 110 wishes to replace with a virtual chair to view how the virtual chair would look in the room. According to some example embodiments, to initiate the method 300 discussed above, the user selects a button 807 in the user interface 802 to initiate physical object replacement.

Figure 9A:
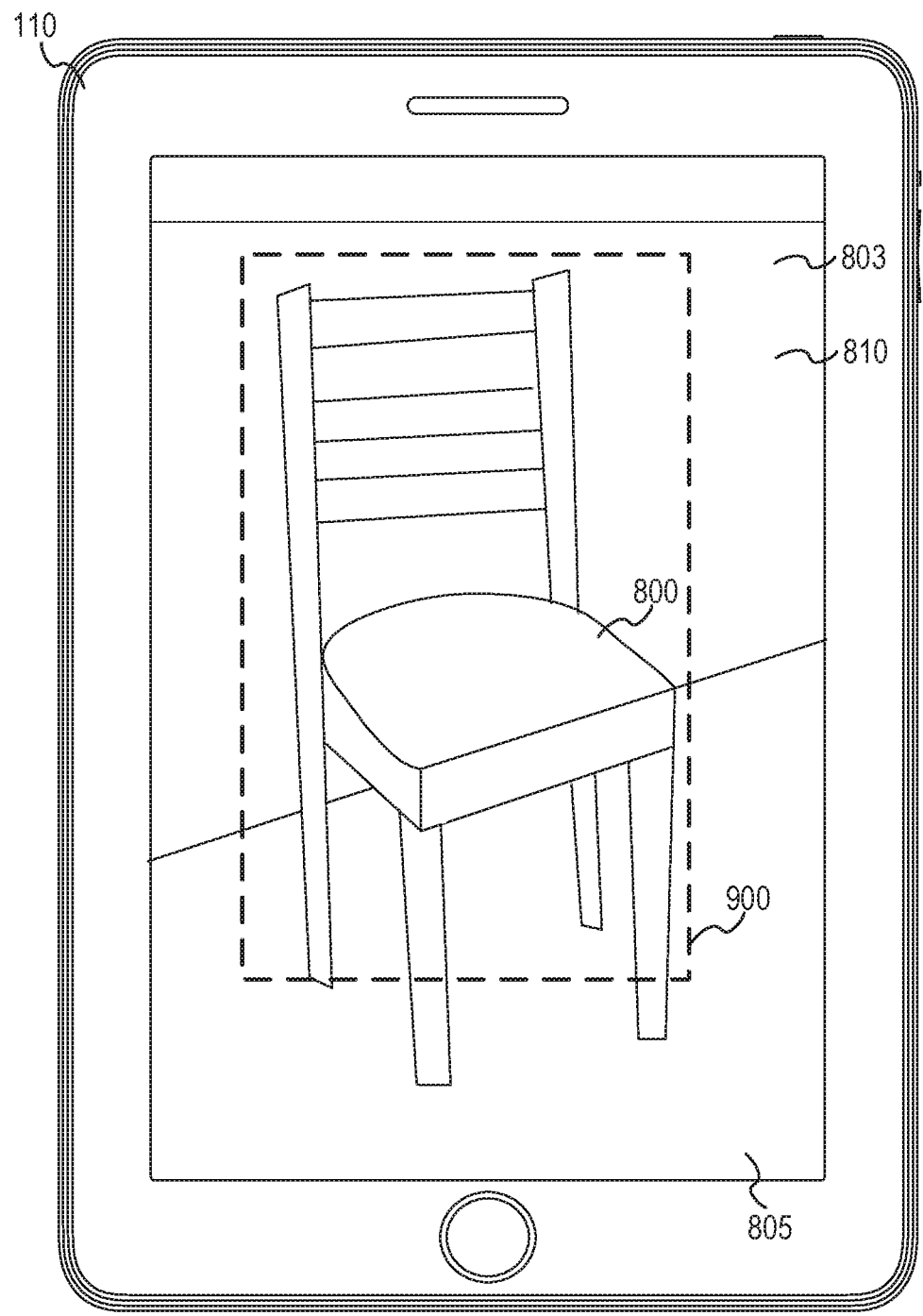
FIGS. 9A-9C show example user interfaces and mask data for selecting a physical item, according to some example embodiments.
Figure 9B:
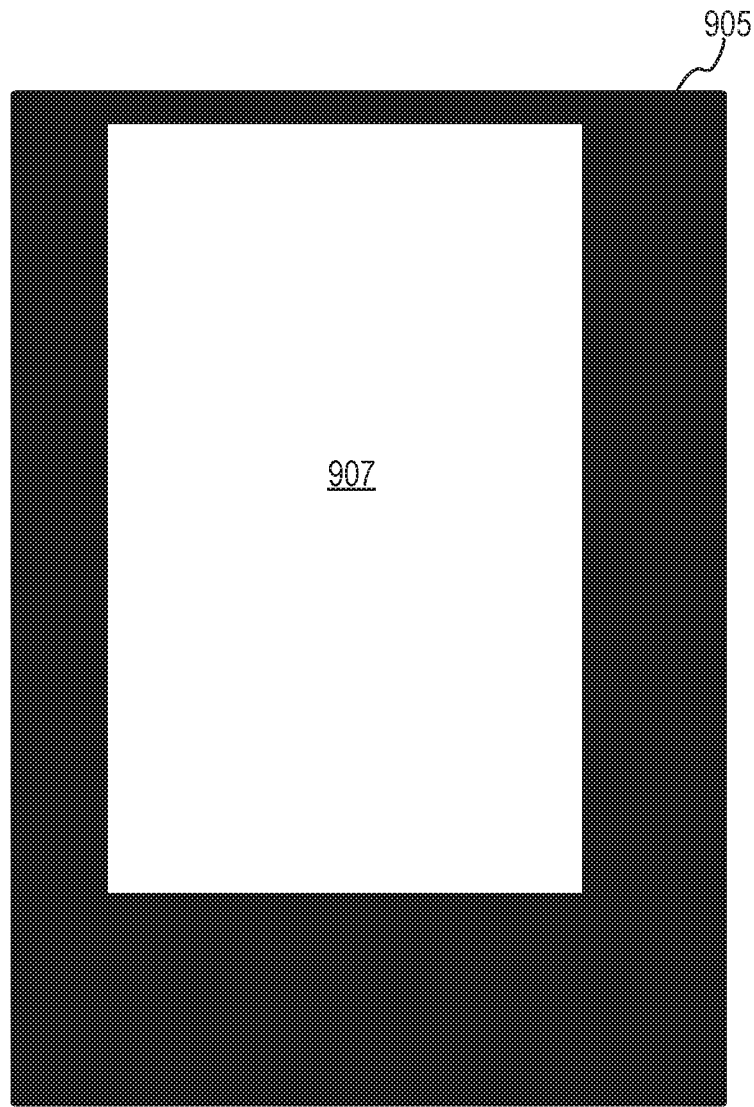
Figure 9C:
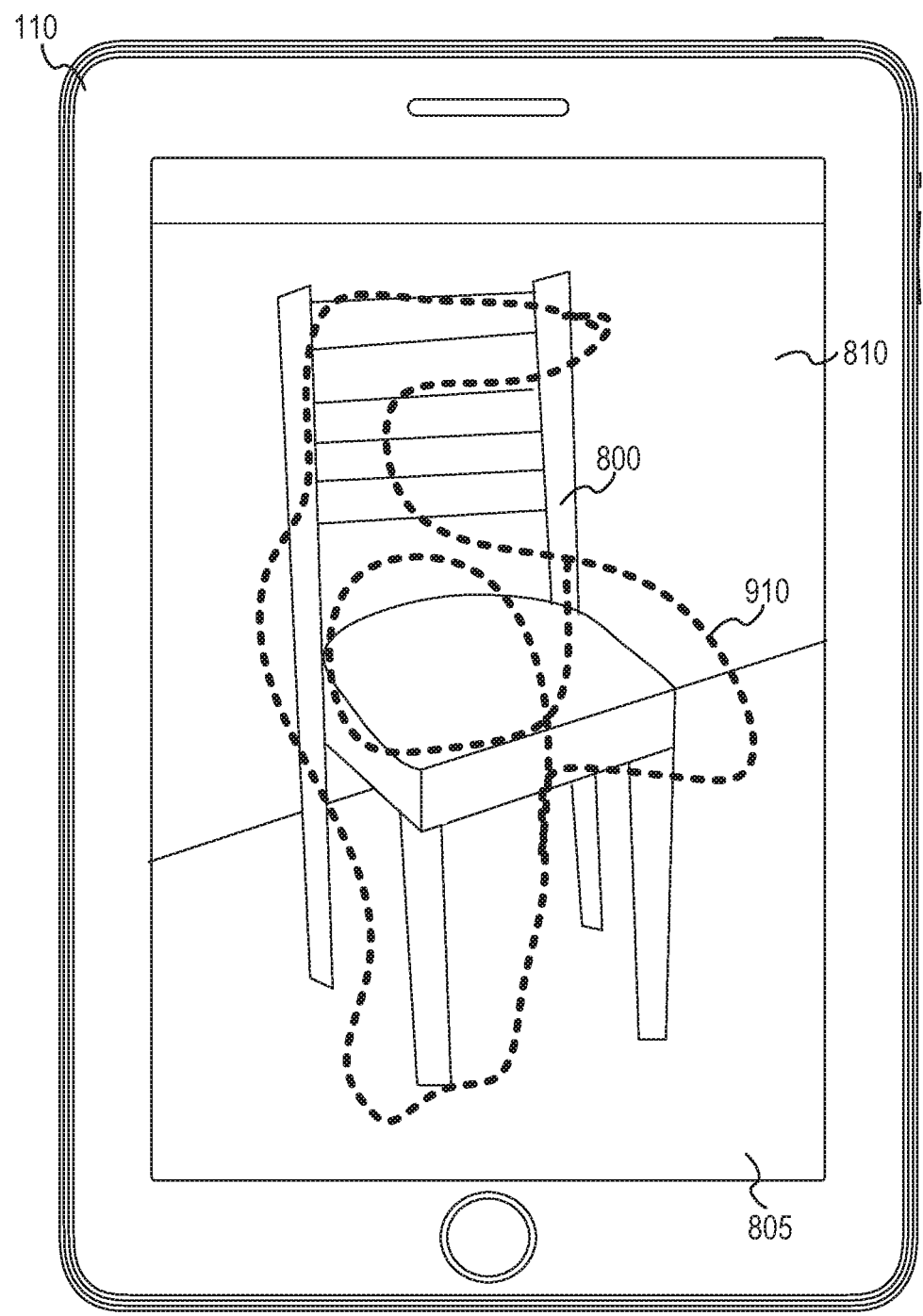

FIGS. 9A-9C show example user interfaces and mask data for selecting a physical item, according to some example embodiments. In FIG. 9A, the user of the client device 110 selects the chair 800, within the image 803, for removal by performing a drag or swipe gesture over the chair 800 to create a polygon shape 900 that approximately circumscribes the object be removed, i.e., the chair 800. Upon the polygon shape 900 being created, the mask engine 215 generates an image mask using the polygon shape 900 and creates a hole in the image 803 for interpolation or inpainting as discussed above.

FIG. 9B shows an example image mask 905, according some example embodiments. As illustrated, the image mask 905 may have the same image size (width and height) as the image 803 and include a mask region 907 corresponding to the shape created by the user inputting the polygon shape. The mask region 907 can be implemented as input data for an inputting scheme, or can be used to delete or otherwise remove the chair region within the image 803, thereby creating a modified version of the image 803 with the chair region removed.

FIG. 9C shows an additional approach for selecting the physical item, according to some example embodiments. In FIG. 9C, the user of the client device 110 selects the chair 800 for removal by performing a scribble gesture on the image over the depicted chair 800. The mask engine 215 then stores an arbitrary shape 910 (e.g., line data, a user interface (UI) scribble) that describes the approximate region of pixels that depict the object to be removed. In some example embodiments, the mask engine 215 adds padding on both sides of the arbitrary shape 910 to "thicken" the line (e.g., the original line may be two pixels in thickness and may be thickened via padding of five pixels on both sides of the line, thereby creating a twelve-pixel thickened line). The padded arbitrary shape 910 is then applied to the original image to create a hole or masked area in the shape of the arbitrary shape 910 for interpolation and inpainting.

As illustrated by the examples of FIG. 9A and FIG. 9C, the shape or input used to indicate the chair to be removed can be roughly input (e.g., sloppy) and not include portions of the chair (e.g., the portion of the chair legs below the shape 900, or regions of the chair not removed by the arbitrary shape 910). While the shape input and the resulting mask may not completely remove the object from the image, the removal engine 210 can implement an interpolation or inpainting technique that is contextually aware of remaining chair segments such that the chair is completely removed or inpainted over via the removal engine 210, as discussed in further detail below.

Figure 10:
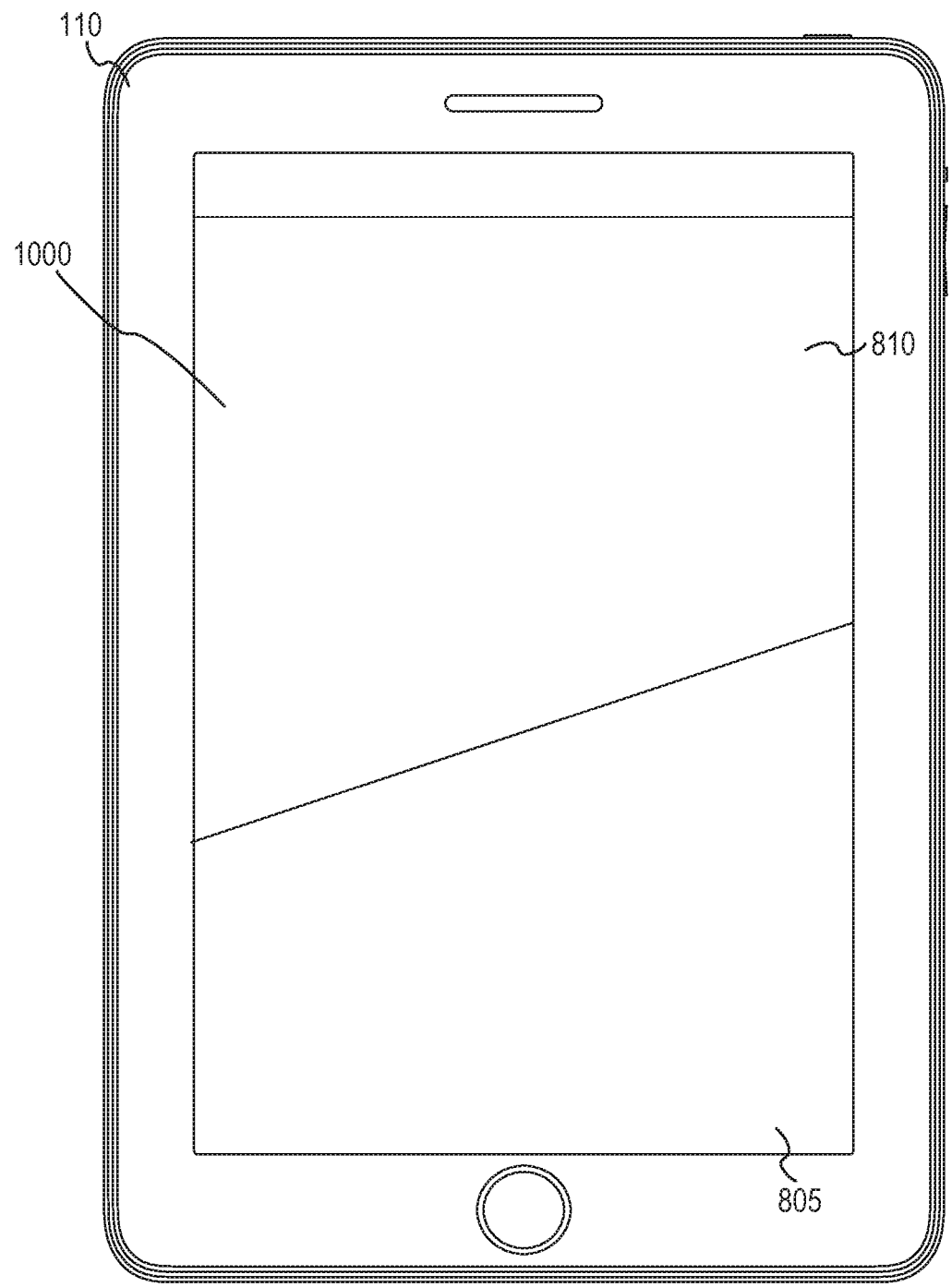
FIG. 10 shows an example user interface depicting an image of the physical item removed via image manipulation, according to some example embodiments.

FIG. 10 shows an example user interface depicting an image 1000 of the physical item removed via image manipulation, according to some example embodiments. As discussed, in some example embodiments, the removal engine 210 implements image merging techniques that patch over a specified area of the image. In some example embodiments, the removal engine 210 paints over the hole area of the image using pixel colorations from nearby areas. In some example embodiments, the removal engine 210 implements a patch based-matching scheme (e.g., PatchMatch algorithm) to find correspondences between regions of the missing area (e.g., the hole) and the surrounding areas and replace the missing area with image data from nearby areas. In some example embodiments, the removal engine 210 implements a partial convolutional inpainting neural network (e.g., partial convolution inpainting), in which the partial convolutions at each layer of the network are updated to remove masking where a given partial convolution is able to operate on unmasked data. In some example embodiments, the removal engine 210 implements a diffusion based inpainting scheme (e.g., Navier Strokes) to fill missing areas in the images.

Figure 11:
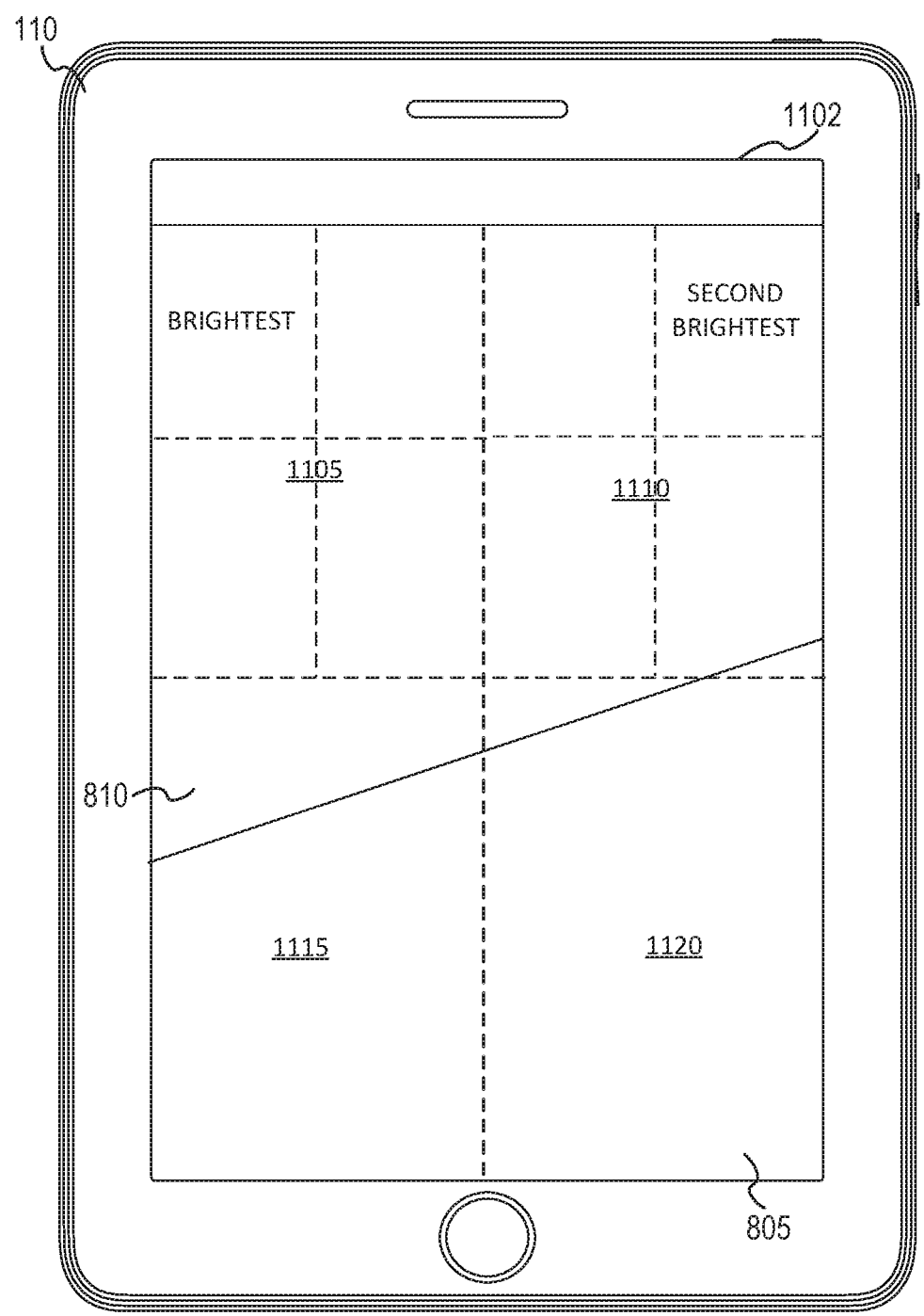
FIG. 11 shows an example user interface for determining light sources, according to some example embodiments.

FIG. 11 shows an example user interface 1102 for determining light sources, according to some example embodiments. In the example illustrated, the image with the chair removed is separated into regions 1105-1120. The light engine 225 then analyzes the pixel values of each region to determine approximate locations of light sources. For example, the light engine 225 averages the pixel values of each of the regions 1105-1120 to determine that the region 1105 is the brightest and the region 1110 is the second brightest. Further, the light engine 225 identifies portions within each of the regions 1105 and 1110 that are brightest to determine the directions of likely light sources. For example, the light engine 225 can partition the region 1105 into four additional areas (as denoted by the additional dotted lines in the region 1105), and further determine that the upper left portion of the region 1105 is brightest to determine that a light source is likely above and to the left of the client device 110. In the example illustrated, the light engine 225 further determines that another brightest region in the top right portion of the region 1110 is the second-brightest sub-region.

Figure 12:
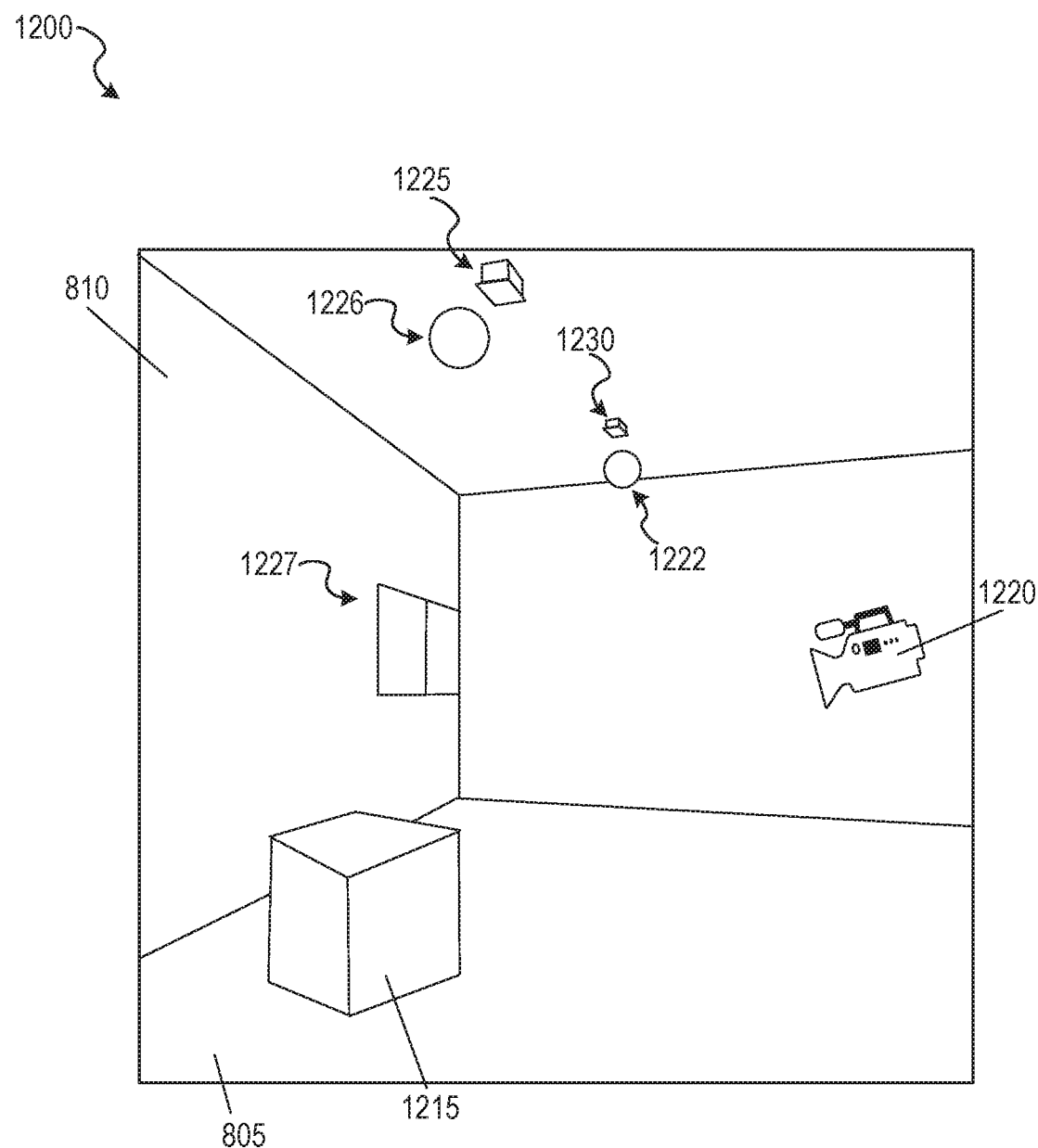
FIG. 12 shows an illustrative example of a physical room used for light source positioning, according to some example embodiments.

FIG. 12 shows an illustrative example of a physical room used for light source positioning, according to some example embodiments. A camera 1220 corresponds to an image sensor or client device (e.g., smart phone) that generates the image in FIG. 11. The real physical light sources include sunlight emanating from a window 1227, and light coming from ceiling lights 1225 and 1230, which collectively shine down on an object (e.g., a cube 1215, the chair 800), thereby making certain regions of an image generated by the camera 1220 brighter. In response to determining that one or more regions of the image are brighter (e.g., via region data of FIG. 11), the model engine 227 then positions virtual light sources 1222 and 1226 above and to the right of the cube 1215 in a virtual modeling environment. The virtual modeling environment is a 3D modeling environment aligned to the room depicted in FIG. 12. For example, a virtual wall can be created to correspond to the wall 810, a virtual floor can be created in the modeling environment to correspond to the ground 805, and a virtual camera can be positioned with respect to the virtual walls based on the real-world positioning of the camera 1220 that generated the image (e.g., a backside image camera of the client device 110).

In some example embodiments, image processing or rendering techniques are implemented to simulate the lighting of the environment, in addition to placement of virtual light sources. For example, the image of the physical environment can be analyzed to determine a lighting scheme (e.g., overall brightness or luminance value of the image, identification of lighter and darker areas, etc.) and the lighting scheme can be simulated by darkening the render of the virtual object (e.g., darkening the texture surface, darkening the spectral quality, reflectance, and so on) in addition to simulating the lighting sources via virtual light source placement. In this way, for example, a virtual render of a chair in a shadowy corner can be first darkened using a global exposure setting for the rendered object, and then virtual rays from one or more virtual light sources can reflect off the virtual chair to further increase simulation accuracy.

Figure 13:
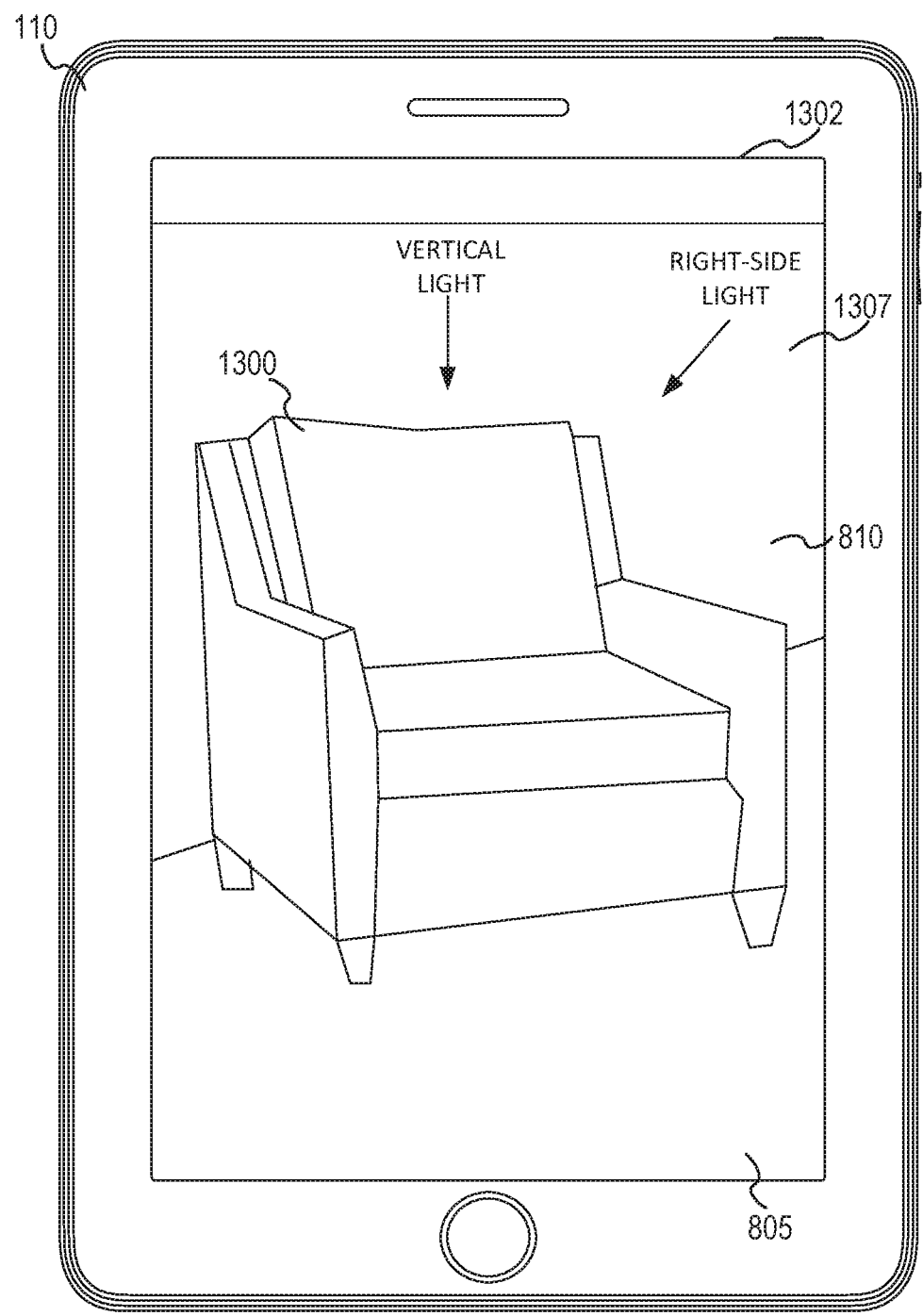
FIG. 13 shows an example user interface depicting a modified image, according to some example embodiments.

FIG. 13 shows an example user interface 1302 depicting a modified image 1307, according to some example embodiments. After placement of the virtual light sources 1222 and 1226 (FIG. 12), the model engine 227 then arranges a three-dimensional model of a virtual chair 1300 in the modeling environment in the same arrangement as the original chair (e.g., backside against the wall 810). In some example embodiments, the pose engine 220 is implemented to determine the pose of the physical chair (e.g., sitting on the ground 805 with the back of the chair 800 facing the wall 810), and the model engine 227 arranges the virtual chair 1300 in the same pose for rendering, as illustrated. Further, due to determination of real-world light sources and placement of corresponding virtual light sources, the virtual chair is realistically illuminated and appears to be a real-world object in the physical room.

Figure 14A:
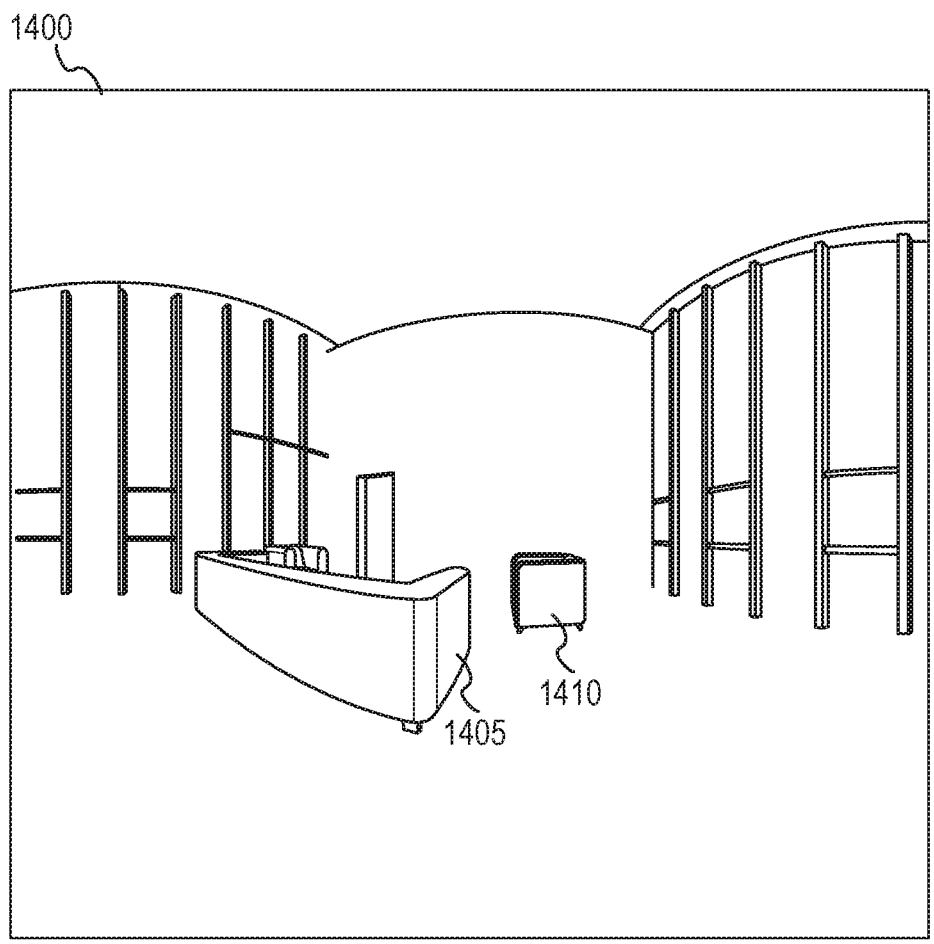
FIGS. 14A-14C show image segmentation for physical object selection, according to some example embodiments.
Figure 14B:
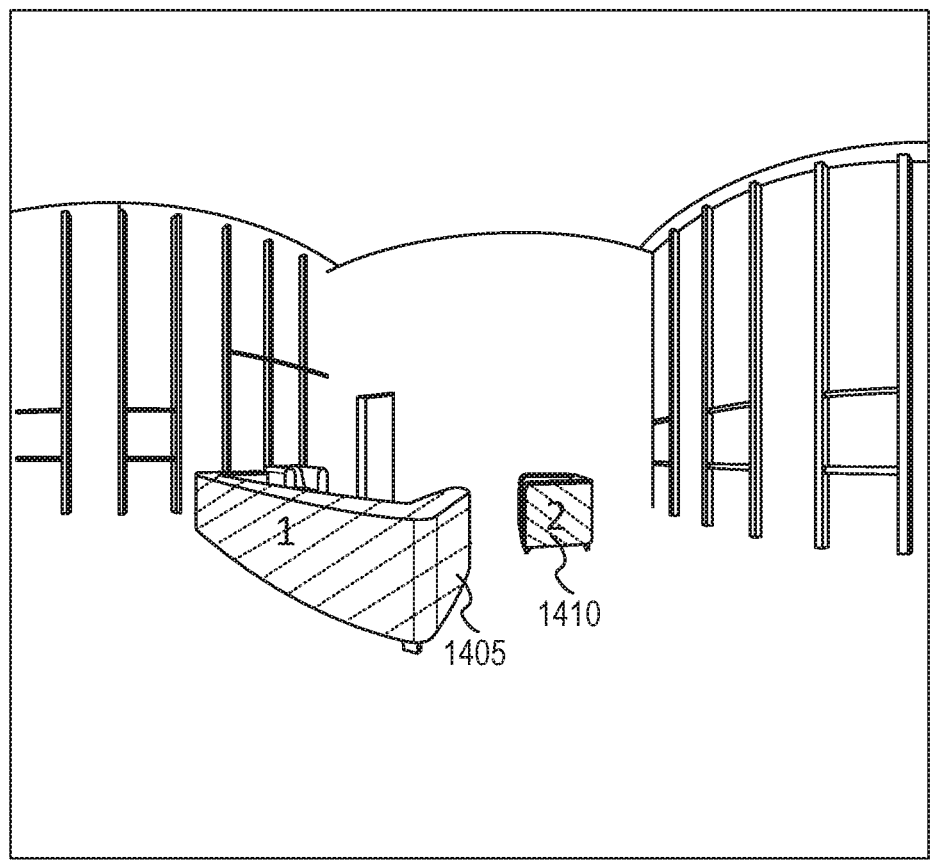
Figure 14C:
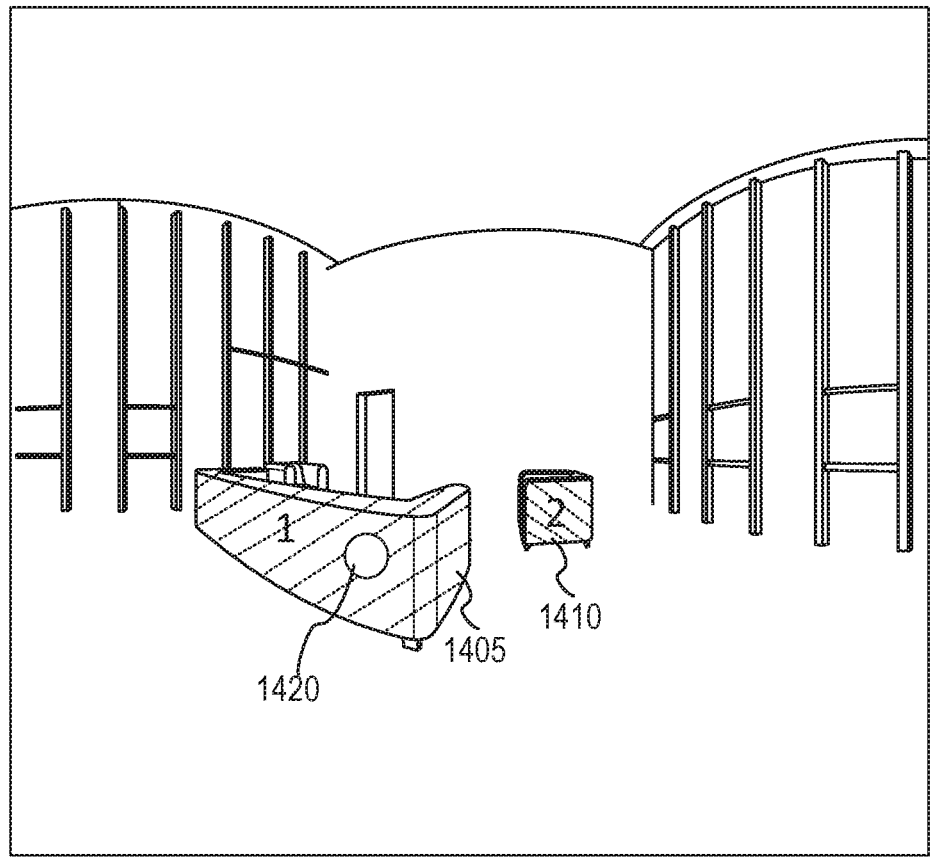

FIGS. 14A-14C show image segmentation for physical object selection, according to some example embodiments. In FIG. 14A, an image 1400 is of a couch 1405 and a chair 1410 in a room. In response to the user initiating the physical item replacement system 150 to replace an item (e.g., via selection of the button 807 in FIG. 8), the removal engine 210 implements a segmentation neural network to segment areas of the image 1400. The segmented areas are masks that denote different regions of the image 1400. For example, with reference to FIG. 14B, the segmentation neural network segments or labels all pixels depicting the couch 1405 as "1" and labels all pixels depicting the chair 1410 as "2". The user can then select a physical object for removal by selecting anywhere within one of the segmented regions. For example, with reference to FIG. 14C, the user can tap on the couch 1405 as indicated by a circle UI element 1420, and the entire couch 1405 is stored as mask data for input into the removal engine 210, as discussed above, according to some example embodiments.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor; such as a field-programmable gate array (FPGA) or an application-specific integrated circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instant of time and to constitute a different hardware module at a different instant of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory, structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application programming interface (API)).

The performance of certain of the operations may be distributed among the processors, not only residing within a single machine, but deployed across a number of machines.

In some example embodiments, the processors or processor-implemented modules can be located in a single geographic location (e.g., within a home environment, an office environment, or a server farm). In other example embodiments, the processors or processor-implemented modules are distributed across a number of geographic locations.

Figure 15:
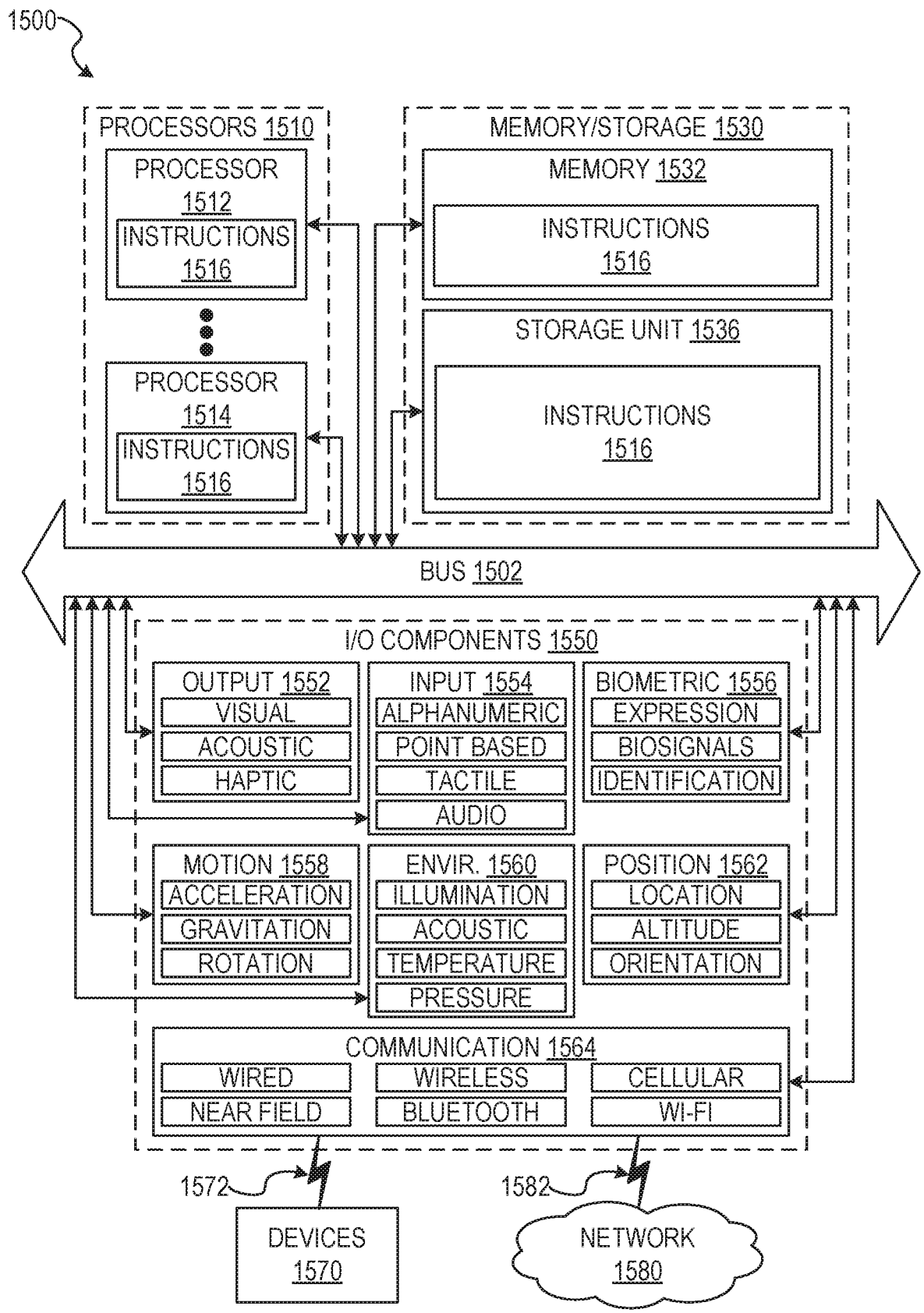
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code), for causing the machine 1500 to perform any one or more of the methodologies discussed herein, can be executed. For example, the instructions 1516 can cause the machine 1500 to execute the flow diagrams of FIGS. 3-7. Additionally, or alternatively, the instructions 1516 can implement the capture engine 205, the classification engine 207, the removal engine 210, the mask engine 215, the pose engine 220, the light engine 225, the model engine 227, and the display engine 230 of FIG. 2, and so forth. The instructions 1516 transform the general, non-programmed machine 1500 into a particular machine programmed to carry out the described and illustrated functions in the manner described. In alternative embodiments, the machine 1500 operates as a standalone device or can be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 can include processors 1510, memory/storage 1530, and I/O components 1550, which can be configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) an include, for example, a processor 1512 and a processor 1514 that may execute the instructions 1516. The term "processor" is intended to include multi-core processors 1510 that may comprise two or more independent processors 1512, 1514 (sometimes referred to as "cores") that can execute the instructions 1516 contemporaneously. Although FIG. 15 shows multiple processors 1510, the machine 1500 may include a single processor 1510 with a single core, a single processor 1510 with multiple cores (e.g., a multi-core processor 1510), multiple processors 1510 with a single core, multiple processors 1510 with multiple cores, or any combination thereof.

The memory/storage 1530 can include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 can also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

As used herein, the term "machine-readable medium" means a device able to store the instructions 1516 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EPROM)), or any suitable combination thereof. The term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., the instructions 1516) for execution by a machine (e.g., the machine 1500), such that the instructions, when executed by one or more processors of the machine (e.g., the processors 1510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1550 can include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 can include many other components that are not shown in FIG. 15. The I/O components 1550 are grouped according to functionality merely for simplifying the following discussion, and the grouping is in no way limiting. In various example embodiments, the components 1550 can include output components 1552 and input components 1554. The output components 1552 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1550 can include biometric components 1556, motion components 1558, environmental components 1560, or position components 1562 among a wide array of other components. For example, the biometric components 1556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 can include acceleration sensor components (e.g., an accelerometer), gravitation sensor components, rotation sensor components (e.g., a gyroscope), and so forth. The environmental components 1560 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or other suitable device to interface with the network 1580. In further examples, the communication components 1564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1570 may be another machine or any of a wide variety of peripheral devices (e.g., a peripheral device coupled via a Universal Serial Bus (USB)).

Moreover, the communication components 1564 can detect identifiers or include components operable to detect identifiers. For example, the communication components 1564 can include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced. Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FIR network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data. Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data-transfer technology.

The instructions 1516 can be transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, the instructions 1516 can be transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    generating, using one or more processors of a mobile device, an image of a physical environment;
    receiving, on a touchscreen of the mobile device, a selection of an object to be replaced in the image;
    classifying the object into an object category using an object classification neural network;
    selecting a pose detection neural network from a plurality of pose detection neural networks based on the object being classified in the object category, each of the plurality of pose detection neural networks being trained for different types of objects;
    determining a three-dimensional orientation of the object as depicted within the image using the pose detection neural network comprising a convolutional neural network trained to detect three-dimensional orientation of objects in a plurality of object training images, the objects of the plurality of object training images being of a same type as the object detected in the image;
    removing, from the image, the object using regions that are proximate to the object in the image;
    generating a render of a virtual model in the three-dimensional orientation and as illuminated by one or more virtual light sources based on a lighting scheme in the image; and
    generating a modified image that depicts the render replacing the object in the physical environment.

2. The method of claim 1, further comprising:
    determining the lighting scheme of the image.

3. The method of claim 2, wherein determining the lighting scheme comprises determining one or more bright regions of the image.

4. The method of claim 3, further comprising:
    positioning, in a virtual environment, the one or more virtual light sources based on locations of the one or more bright regions of the image.

5. The method of claim 3, wherein the determining of the one or more bright regions of the image comprises determining an area of pixels in the image having higher brightness values.

6. The method of claim 1, wherein, in the image, the object is depicted in an object image region, and the regions that are proximate to the object in the image are proximate regions that are external to the object image region.

7. The method of claim 6, wherein the object is removed by merging the proximate regions and the object image region.

8. The method of claim 7, wherein the proximate regions and the object image region are merged using a neural network that implements partial convolutional layers.

9. The method of claim 6, wherein the object is removed by interpolating the proximate regions and the object image region.

10. The method of claim 1, further comprising:
    displaying the image on a display device of the mobile device; and
    receiving selection of the object through the display device of the mobile device.

11. The method of claim 10, wherein receiving selection of the object comprises receiving selection of a selected region of the image that depicts the object.

12. The method of claim 11, further comprising:
    generating an image mask using the selected region.

13. The method of claim 11, further comprising:
    segmenting the image into segment regions using an image segmentation convolutional neural network (CNN), wherein the selected region is identified from a user input on the image as displayed on the touchscreen of the mobile device.

14. The method of claim 13, wherein the user input is one of: a tap gesture or a click.

15. The method of claim 11, wherein receiving selection of the object through the display device comprises:
    receiving, on the touchscreen of the mobile device, a swipe gesture over at least a portion of the object as depicted in the image.

16. The method of claim 1, further comprising:
    receiving, on the touchscreen of the mobile device, an additional selection that selects an additional object to be replaced in the image, the additional object and the object being different types of objects;
    classifying the additional object into another object category using the object classification neural network;
    selecting another pose detection neural network from the plurality of pose detection neural networks based on the additional object being classified in the another object category, wherein each of the plurality of pose detection neural networks are trained for different types of objects;

determining an additional three-dimensional orientation of the additional object as depicted within the image using the another pose detection neural network;

removing, from the image, the additional object from the image;

generating an additional render of an additional virtual model in the additional three-dimensional orientation and as illuminated by the one or more virtual light sources based on the lighting scheme in the image; and generating a modified image that depicts the additional render replacing the additional object.

17. A system comprising:

one or more processors;

a touchscreen a memory storing instructions that, when executed by the one or more processors, cause the system to perform operations comprising:

generating an image of a physical environment;

receiving, on the touchscreen, a selection of an object to be replaced in the image;

classifying the object into an object category using an object classification neural network;

selecting a pose detection neural network from a plurality of pose detection neural networks based on the object being classified in the object category, each of the plurality of pose detection neural networks being trained for different types of objects;

determining a three-dimensional orientation of the object as depicted within the image using the pose detection neural network comprising a convolutional neural network trained to detect three-dimensional orientation of objects in a plurality of object training images, the objects of the plurality of object training images being of a same type as the object detected in the image;

removing, from the image, the object using regions that are proximate to the object in the image;

generating a render of a virtual model in the three-dimensional orientation and as illuminated by one or more virtual light sources based on a lighting scheme in the image; and generating a modified image that depicts the render replacing the object in the physical environment.

18. The system of claim 17, the operations further comprising:

determining the lighting scheme of the image.

19. The system of claim 18, wherein determining the lighting scheme comprises determining one or more bright regions of the image.

20. A machine-readable storage device embodying instructions that, when executed by a device, cause the device to perform operations comprising:

generating an image of a physical environment;

receiving, on a touchscreen, a selection of an object to be replaced in the image;

classifying the object into an object category using an object classification neural network;

selecting a pose detection neural network from a plurality of pose detection neural networks based on the object being classified in the object category, each of the plurality of pose detection neural networks being trained for different types of objects;

determining a three-dimensional orientation of the object as depicted within the image using the pose detection neural network comprising a convolutional neural network trained to detect three-dimensional orientation of objects in a plurality of object training images, the objects of the plurality of object training images being of a same type as the object detected in the image;

removing, from the image, the object using regions that are proximate to the object in the image;

generating a render of a virtual model in the three-dimensional orientation and as illuminated by one or more virtual light sources based on a lighting scheme in the image; and generating a modified image that depicts the render replacing the object in the physical environment.

* * * * *